United States Patent Office 2,907,105
Patented Oct. 6, 1959

2,907,105

METHOD OF SOLDERING ALUMINUM

Rihei Ohmi, Ichikawa City, Japan

No Drawing. Application June 21, 1956
Serial No. 592,861

1 Claim. (Cl. 29—498)

The present invention relates to an improved solder of the zinc-aluminum class containing a preponderating portion of zinc, for use particularly in soldering aluminum or aluminum-base alloys.

Solders of this class have been known for many years, and there has been a number of proposals for modifying them by the addition of various minor constituents.

The soldering of aluminum is a problem which has long troubled fabricators of this useful light metal. Many have had poor results. One of the major problems involved in the soldering of aluminum is the formation of a tenacious skin of oxide covering the exposed surfaces to be bonded at all times, and the object of this invention is to provide an improved solder in particular a considerably tenacious adhesion to the parent metal without the application of a commercial flux of the alkali type available in the market prior to soldering.

According to the present invention, I provide a solder of the kind described containing 2–5% copper, 4–7% aluminum, and the remainder zinc of a high purity of 99.95%.

A solder for soldering aluminum and aluminum-base alloy without the use of a flux is one containing 2.3–3.5% copper, 6–7% aluminum, and 89.5–91.5% zinc of the purity of 99.995%.

In applying the solder of the invention to a lap or butt joint to be soldered, no flux is required to remove the oxide layer on the aluminum or aluminum-base alloy surface as I have hereinbefore disclosed, but it is only required to permit the molten metal from the solder to unite with the parent metal. As a source of heat in order to melt and apply the solder to the joint, any source of heat, such as a gas or oil burner, or an electric heater, or any fuel, such as, charcoal or coke can be applied effectively. A soldering iron can be used to advantage. As the melting point of the solder of the invention is about 350° C., there is no danger to destroy the parent metal.

I have found the tensile strength of the bonded joint soldered by the solder of the invention to be more than 16 kilograms per square millimeter, which is stronger than that of a commercial aluminum sheet, that is, 12 kilograms per square millimeter.

It is believed that the excellent adhesion of my solder without the application of a flux is due to the high purity of zinc.

Moreover, the preponderating content of zinc in the solder of the invention exerts a beneficial effect on the corrosion resistance of the solder and the soldered joint.

I claim:

In a process of soldering aluminum or aluminum-base alloys comprising the steps of applying a flux-less solder to said aluminum or aluminum-base alloy without removing the oxide layer from the surface thereof, said solder consisting of 2.3%–3.5% copper, 6%–7% aluminum and 89.5%–91.5% zinc of the purity of 99.995%, applying heat to the solder in the order of 350° C., melting the solder and applying it to the joint to bond said aluminum or aluminum-base alloy, whereby the tensile strength of the bonded joint is in the order of 16 kilograms per square millimeter.

References Cited in the file of this patent

FOREIGN PATENTS 376,534    Great Britain _____ July 14, 1932

OTHER REFERENCES

Circular of the Bureau of Standards, No. 78, page 8, table 3, issued Jan. 23, 1919, by the Department of Commerce, Washington, D.C.